(12) United States Patent
Bleakley et al.

(10) Patent No.: US 9,009,303 B2
(45) Date of Patent: *Apr. 14, 2015

(54) CORRELATING EVENT STREAMS FROM INDEPENDENT PROCESSES IN A COMPLEX BUSINESS SYSTEM USING METADATA ASSOCIATED WITH THE TRANSPORT INTERCONNECTIONS

(75) Inventors: Darrell Bleakley, Raleigh, NC (US); Erik J. Burckart, Raleigh, NC (US); Palanisamy A. Gounder, Irving, TX (US); Thurman O. Pylant, Priddy, TX (US); Steven D. Woodcock, Highland Village, TX (US)

(73) Assignee: International Business Machines Corporation, Armonk, NY (US)

( * ) Notice: Subject to any disclaimer, the term of this patent is extended or adjusted under 35 U.S.C. 154(b) by 524 days.

This patent is subject to a terminal disclaimer.

(21) Appl. No.: 13/405,281

(22) Filed: Feb. 25, 2012

(65) Prior Publication Data

US 2013/0151695 A1    Jun. 13, 2013

Related U.S. Application Data

(63) Continuation of application No. 13/323,983, filed on Dec. 13, 2011, now Pat. No. 8,751,643.

(51) Int. Cl.
*G06F 15/173* (2006.01)
*G06F 15/16* (2006.01)
*G06Q 10/00* (2012.01)
*G06Q 30/00* (2012.01)

(52) U.S. Cl.
CPC ............... *G06Q 30/00* (2013.01); *G06Q 10/00* (2013.01)

(58) Field of Classification Search
CPC ..... H04L 43/04; H04L 43/0876; H04L 43/08; H04L 43/045; H04L 67/10
USPC .......................................... 709/203, 223–224
See application file for complete search history.

(56) References Cited

U.S. PATENT DOCUMENTS

| 5,852,449 A | 12/1998 | Esslinger et al. |
| 7,073,176 B1 | 7/2006 | Simmons et al. |
| 8,380,648 B2 | 2/2013 | Matson et al. |
| 2005/0125450 A1 | 6/2005 | Wong et al. |
| 2007/0060367 A1 | 3/2007 | Heler |
| 2007/0150585 A1 | 6/2007 | Chkodrov |
| 2007/0206633 A1 | 9/2007 | Melamed et al. |
| 2010/0268797 A1 | 10/2010 | Pyrik et al. |

OTHER PUBLICATIONS

Office Action for U.S. Appl. No. 13/323,983 dated Sep. 23, 2013.

*Primary Examiner* — Minh-Chau Nguyen
(74) *Attorney, Agent, or Firm* — Robert A. Voigt, Jr.; Winstead, P.C.

(57) ABSTRACT

A method for correlating business events in a complex business system. A flow diagram containing a collection of nodes (representing processes) and links (representing the transport connections) between these nodes is generated. An instance of an event stream from a node that is to be connected to an instance of an event stream from a neighboring node is identified when a node transports a transaction across a link. The metadata associated with the utilized link that was used to transport the transaction between the nodes is obtained. The instances of the event streams are then correlated using the obtained metadata. Further, each instance of the event streams is assigned an identification. In this manner, business events are correlated without the requirement of users providing a common key as well as without the requirement of monitoring each user of the system throughout the entire transaction.

7 Claims, 7 Drawing Sheets

CORRELATING EVENT STREAMS FROM INDEPENDENT PROCESSES IN A COMPLEX BUSINESS SYSTEM USING METADATA ASSOCIATED WITH THE TRANSPORT INTERCONNECTIONS

CROSS-REFERENCE TO RELATED APPLICATIONS

The present application is a continuation application of pending U.S. patent application Ser. No. 13/323,983, which was filed on Dec. 13, 2011, which is assigned to the assignee of the present invention. The present application claims priority benefits to U.S. patent application Ser. No. 13/323,983.

TECHNICAL FIELD

The present invention relates to business system monitoring, and more particularly to correlating event streams from independent processes in a complex business system using metadata associated with the transport interconnections.

BACKGROUND

Many business enterprises use computer systems to monitor and process business activities and transactions. Business entities that handle complex transactions and activities, in particular, often employ distributed computer systems. As such, computer networks, systems and applications involved in such complex transactions and activities are inherently distributed and event-driven.

For example, an online retailer may use a business application to receive online purchase orders, an inventory application to manage the store's inventory and to communicate with its suppliers, and other applications or services to create online interfaces and to manage shipping. In another example, a web server often faces heavy client loads and serves many scripts registered on a number of different uniform resource locators (URLs). Because each client request can cause multiple monitoring events, and the requests are handled asynchronously and independently of each other, the server generates a continuous stream of monitoring events. In this example, a network administrator may be very interested in analyzing the network's performance based on these monitoring events.

In such complex systems, event happenings (e.g., online purchase) involved in the business activities and transactions are monitored to develop a better understanding of the performance of the business enterprise. Typically, monitoring events in such complex systems rely on correlating event streams from independent processes (e.g., online purchase, store inventory) in the complex system using a global identifier (e.g., process identifier, order number) found in each related event. However, as more and more different types of systems (e.g., supplier's system is a different type of system than online retailer) become interconnected with one another, the system participating in the interconnected transaction needs to augment their implementation in order to support the capture and propagation of the global identifier (also referred to as a "common key") between the processes of the distributed systems.

In an attempt to relieve the requirement of augmenting the implementation of these systems, complex systems may prompt the user for a common key (e.g., random number) or a set of keys within the data, which can be used to correlate the events. Another alternative is for the complex systems to attempt to monitor each user of the system throughout the entire transaction from beginning to end.

However, requiring the user to provide a common key or a set of keys within the data to correlate the events is burdensome to the user. Furthermore, monitoring each user of the system throughout the entire transaction is impractical for business enterprises handling numerous transactions involving numerous users. Such a requirement is burdensome to the processing capability of the business enterprise.

Hence, there is not currently a means for efficiently monitoring events of complex business systems.

BRIEF SUMMARY

In one embodiment of the present invention, a method for correlating business events in a business system comprises generating a flow diagram comprising a plurality of nodes and links interconnected between the plurality of nodes, where each of the plurality of nodes represents a process involved in a coordinated transaction. The method further comprises monitoring event streams generated from the plurality of nodes. Additionally, the method comprises identifying an instance of a first event stream from a first node that is to be connected to an instance of a second event stream from a second node, where the second node is a neighboring node of the first node. In addition, the method comprises obtaining metadata contained within one of the first and second event streams associated with a link utilized to transport the coordinated transaction between the first and second nodes. Furthermore, the method comprises correlating the instances of the first and second event streams with the obtained metadata. In addition, the method comprises assigning, by a processor, each instance of the first and second event streams with an identification.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for correlating business events in a complex business system. In one embodiment of the present invention, a flow diagram containing a collection of nodes (representing processes involved in coordinated transactions) and links (representing the transport connections) between these nodes is generated. Event streams generated from these nodes are monitored. An instance of an event stream from a node that is to be connected to an instance of an event stream from a neighboring node is identified. Such an instance is identified when a node transports the transaction across a link. The metadata associated with the utilized link (e.g., data regarding the transport type of the link) that was used to transport the transaction between the nodes is obtained. The instances of the event streams (e.g., data concerning an online purchase, data concerning inventory) are correlated using the obtained metadata. Each instance of the event streams is assigned an identification (referred to herein as the "visibility identification"). In this manner, business events are correlated without the requirement of users providing a common key or a set of keys as well as without the requirement of monitoring each user of the system throughout the entire transaction.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
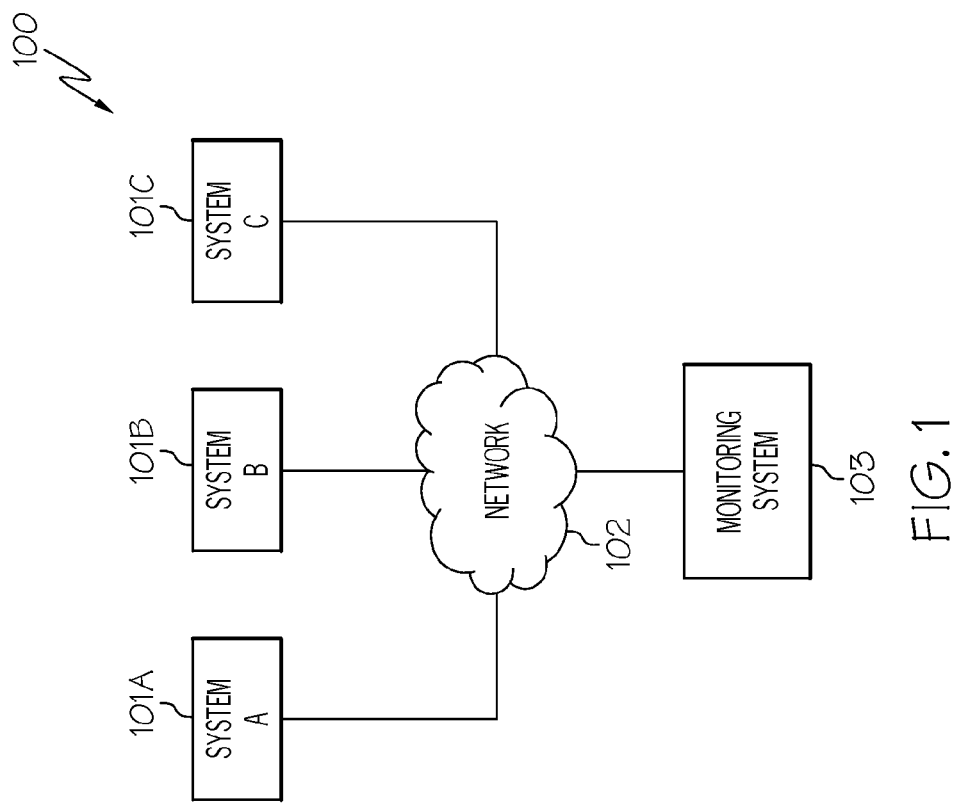
FIG. 1 illustrates a complex business system configured in accordance with an embodiment of the present invention.

Referring now to the Figures in detail, FIG. 1 illustrates a complex business system 100 being monitored in accordance with an embodiment of the present invention. Complex business system 100 may be said to include distributed systems 101A-101C (identified as "System A," "System B," and "System C," respectively in FIG. 1) involved in the business activities and transactions of complex business system 100. Systems 101A-101C may collectively or individually be referred to as systems 101 or system 101, respectively. Systems 101 refer to the systems, applications or processes (e.g., online purchase system, inventory system, supplier system) that are involved in complex business system 100.

Complex business system 100 further includes a monitoring system 103 connected to systems 101 via a network 102. Monitoring system 103 is configured to monitor and correlate events streams from systems 101 as discussed further below. A description of the hardware configuration of monitoring system 103 is provided below in connection with FIG. 2.

Network 102 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used without departing from the scope of the present invention.

While FIG. 1 illustrates three systems 101A-101C, complex business system 100 may include any number of systems 101. The embodiments of complex business system 100 are not to be limited in scope to the depiction of FIG. 1.

Figure 2:
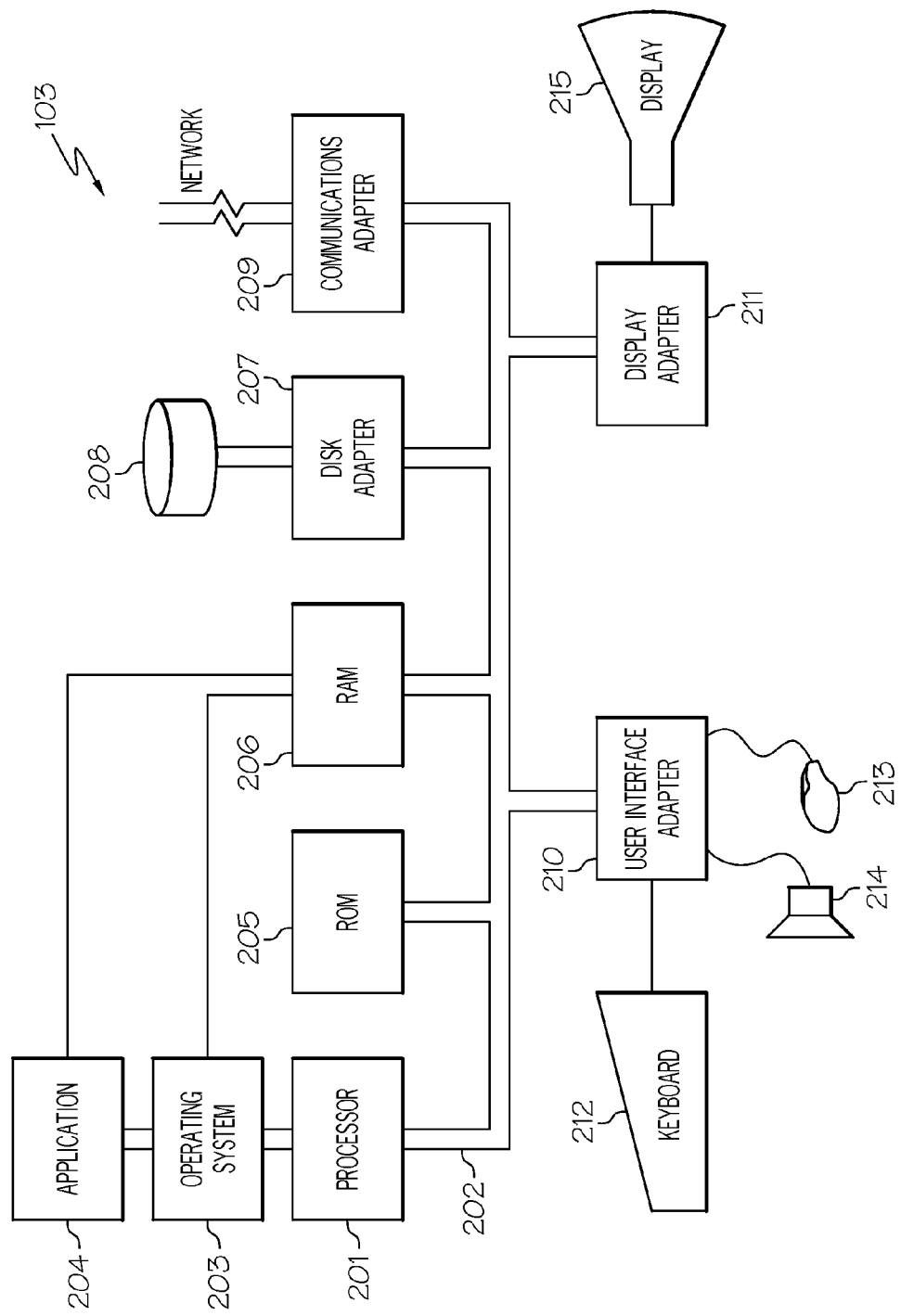
FIG. 2 illustrates a hardware configuration of a monitoring system configured in accordance with an embodiment of the present invention.

Referring now to FIG. 2, FIG. 2 illustrates a hardware configuration of monitoring system 103 (FIG. 1) which is representative of a hardware environment for practicing the present invention. Referring to FIG. 2, monitoring system 103 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for correlating event streams from independent processes in a complex business system as discussed further below in association with FIGS. 3-7.

Referring again to FIG. 2, read-only memory ("ROM") 205 is coupled to system bus 202 and includes a basic input/output system ("BIOS") that controls certain basic functions of monitoring system 103. Random access memory ("RAM") 206 and disk adapter 207 are also coupled to system bus 202. It should be noted that software components including operating system 203 and application 204 may be loaded into RAM 206, which may be monitoring system's 103 main memory for execution. Disk adapter 207 may be an integrated drive electronics ("IDE") adapter that communicates with a disk unit 208, e.g., disk drive. In one embodiment, disk unit 208 stores a table, referred to herein as the link table, that stores data related to the use of links (transport interconnections) for transporting transactions as discussed further below in connection with FIGS. 6-7. It is noted that the program for correlating event streams from independent processes in a complex business system, as discussed further below in connection with FIGS. 3-7, may reside in disk unit 208 or in application 204.

Monitoring system 103 may further include a communications adapter 209 coupled to bus 202. Communications adapter 209 interconnects bus 202 with an outside network (network 102 of FIG. 1) thereby enabling monitoring system 103 to monitor systems 101.

I/O devices may also be connected to monitoring system 103 via a user interface adapter 210 and a display adapter 211. Keyboard 212, mouse 213 and speaker 214 may all be interconnected to bus 202 through user interface adapter 210. A display monitor 215 may be connected to system bus 202 by display adapter 211. In this manner, a user is capable of inputting to monitoring system 103 through keyboard 212 or mouse 213 and receiving output from monitoring system 103 via display 215 or speaker 214.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, monitoring events in complex business systems typically rely on correlating event streams from independent processes (e.g., online purchase, store inventory) in the complex system using a global identifier (e.g., process identifier, order number) found in each related event. However, as more and more different types of systems (e.g., supplier's system is a different type of system than online retailer) become interconnected with one another, the system participating in the interconnected transaction needs to augment their implementation in order to support the capture and propagation of the global identifier (also referred to as a "common key") between the processes of the distributed systems. In an attempt to relieve the requirement of augmenting the implementation of these systems, complex systems may prompt the user for a common key (e.g., random number) or a set of keys within the data, which can be used to correlate the events. Another alternative is for the complex systems to attempt to monitor each user of the system throughout the entire transaction from beginning to end. However, requiring the user to provide a common key or a set of keys within the data to correlate the events is burdensome to the user. Furthermore, monitoring each user of the system throughout the entire transaction is impractical for business enterprises handling numerous transactions involving numerous users. Such a requirement is burdensome to the processing capability of the business enterprise. Hence, there is not currently a means for efficiently monitoring events of complex business systems.

Figure 3:
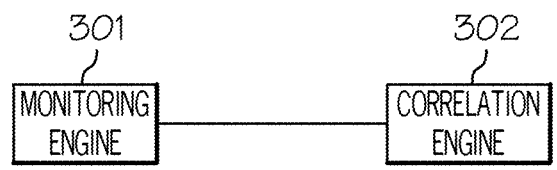
FIG. 3 illustrates the software components used in monitoring the complex business system and correlating event streams in the complex business system in accordance with an embodiment of the present invention.
Figure 4:
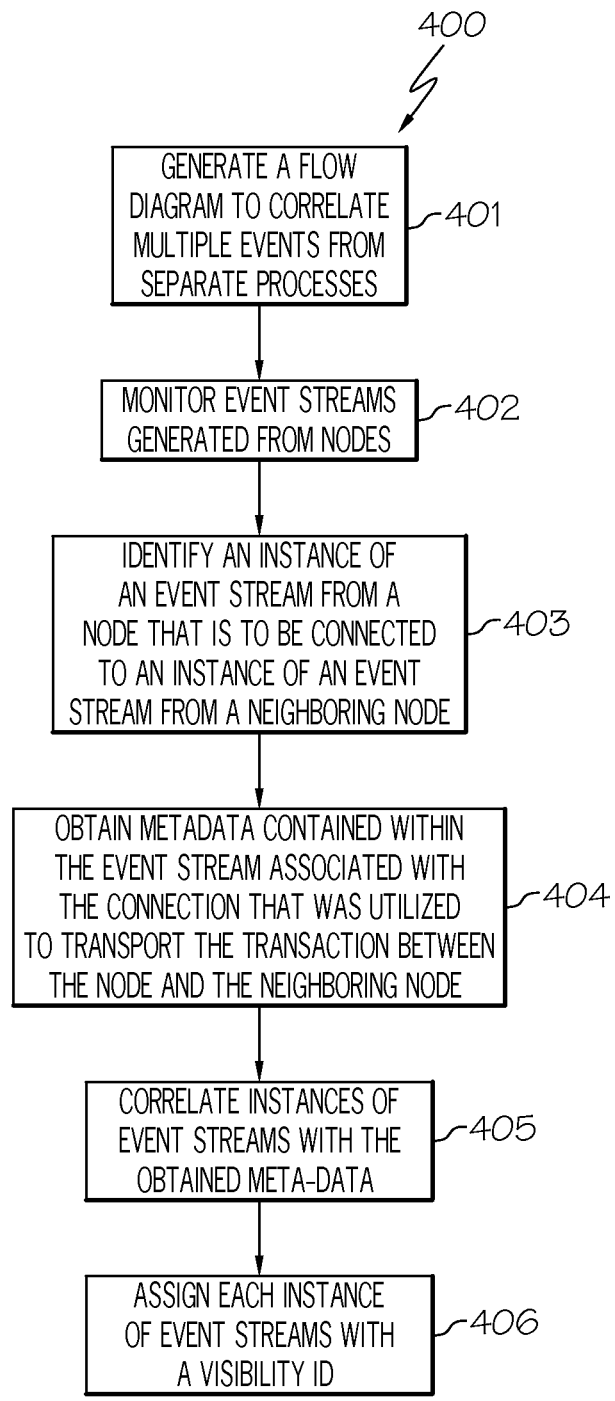
FIG. 4 is a flowchart of a method for correlating business events in a complex business system in accordance with an embodiment of the present invention.
Figure 5:
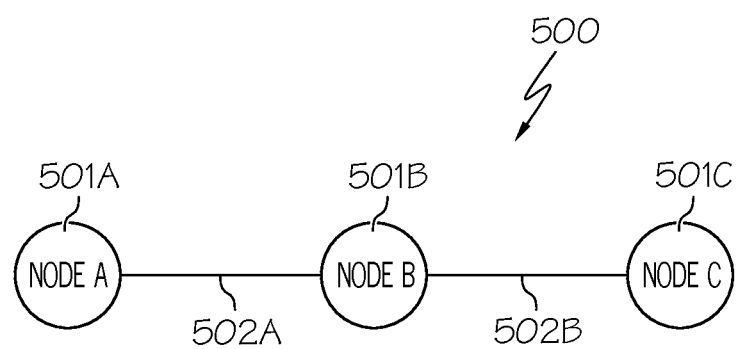
FIG. 5 illustrates a flow diagram depicting the nodes and the links interconnecting the nodes in the complex business system in accordance with an embodiment of the present invention.
Figure 6:
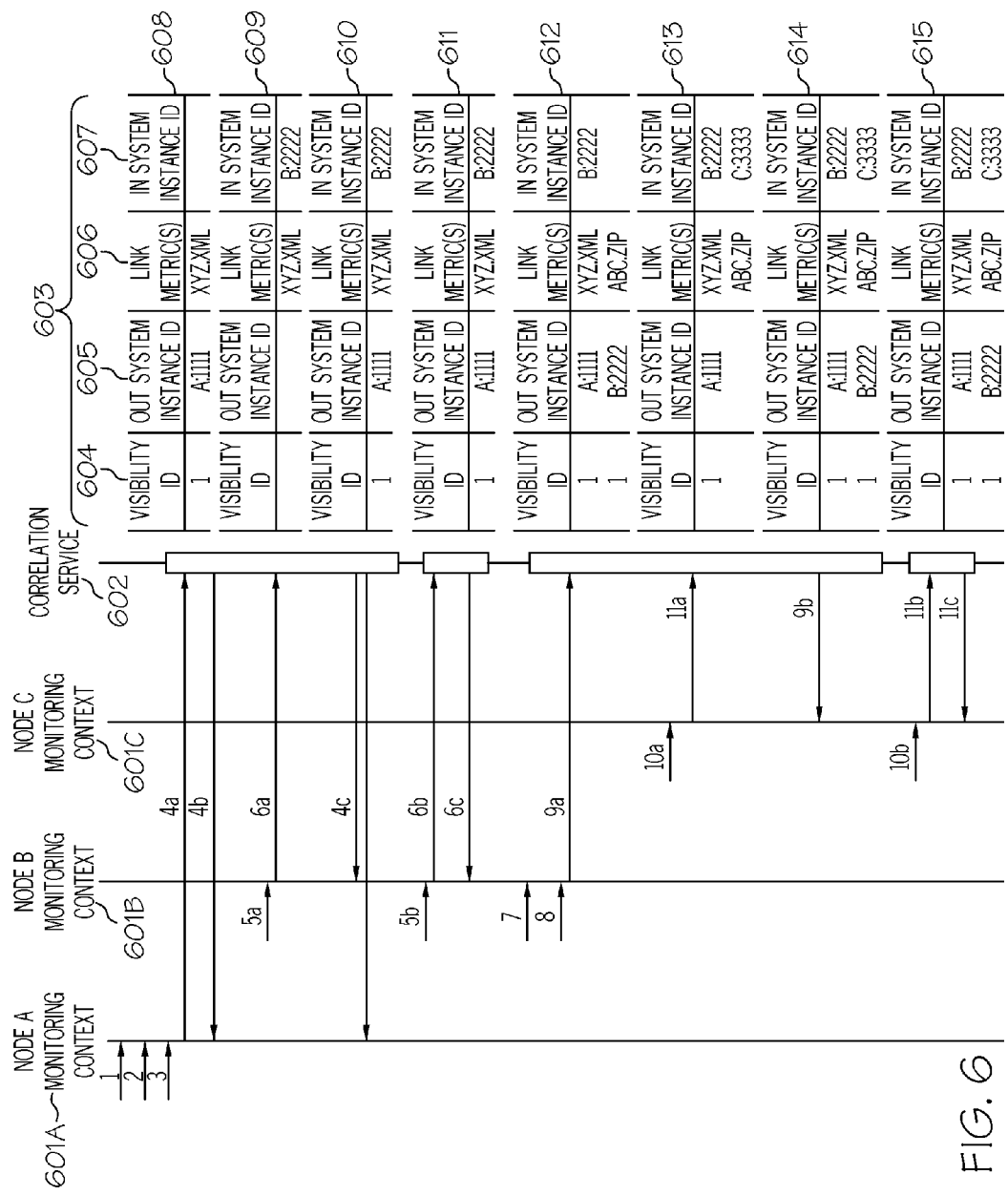
FIG. 6 is a diagram illustrating examples of the possible interactions between the nodes of the complex business system involving the event streams in accordance with an embodiment of the present invention.
Figure 7:
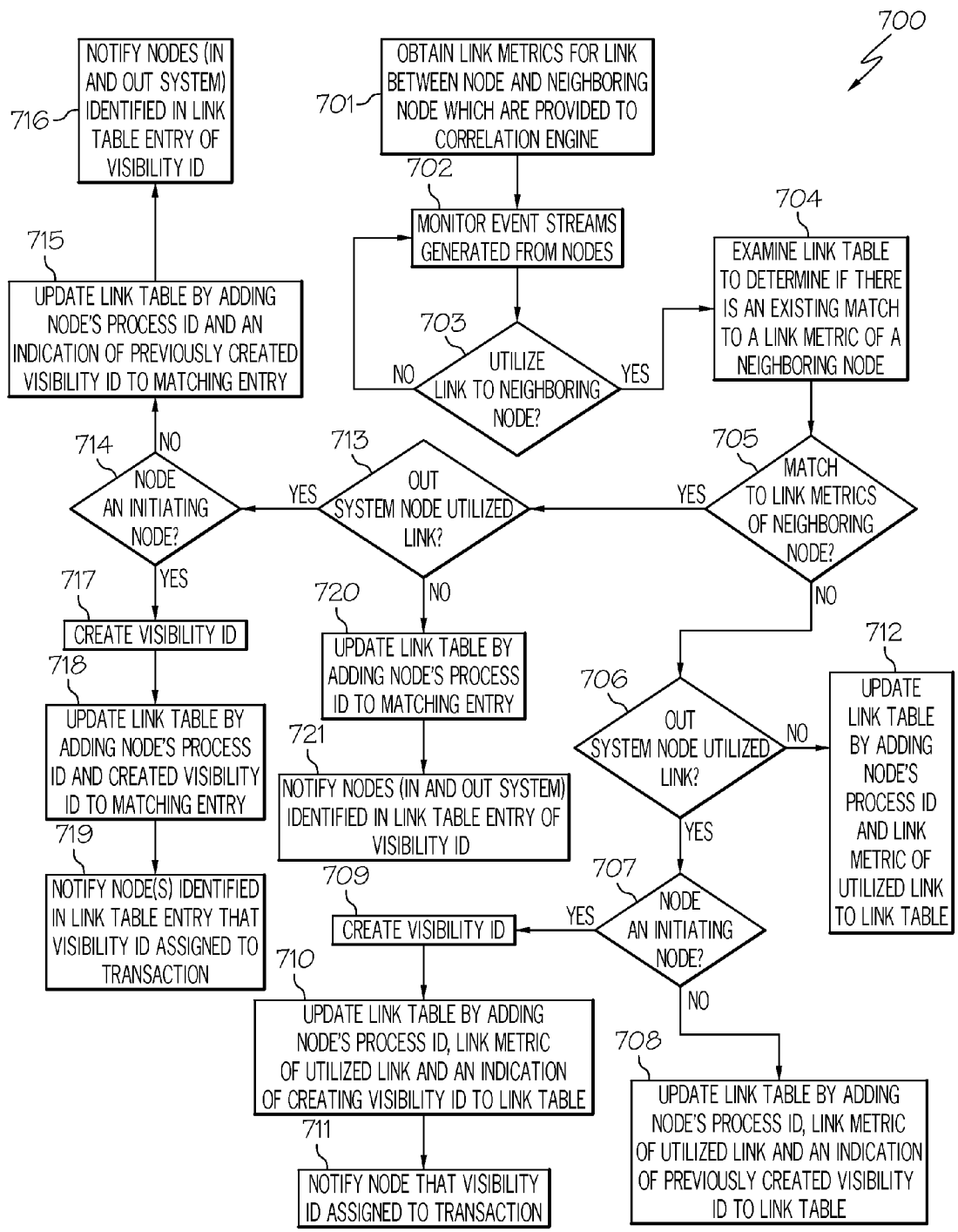
FIG. 7 is a flowchart of a method for correlating business events in a complex business system based on the diagram of FIG. 6 in accordance with an embodiment of the present invention.

The principles of the present invention provide a means for efficiently monitoring events of complex business systems by correlating event streams without the requirement of users providing a common key or a set of keys as well as without the requirement of monitoring each user of the system throughout the entire transaction as discussed below in connection with FIGS. 3-7. FIG. 3 illustrates the software components used in monitoring the complex business system and correlating event streams in the complex business system. FIG. 4 is a flowchart of a method for correlating business events in a complex business system. FIG. 5 illustrates a flow diagram depicting the nodes and the links interconnecting the nodes in the complex business system. FIG. 6 is a diagram illustrating examples of the possible interactions between the nodes of the complex business system involving the event streams. FIG. 7 is a flowchart of a method for correlating business events in the complex business system based on the diagram of FIG. 6.

Referring to FIG. 3, as stated above, FIG. 3 illustrates the software components used in monitoring the complex business system and correlating event streams in the complex business system in accordance with an embodiment of the present invention. In one embodiment, these software components are the components or modules of the program for correlating event streams from independent processes in a complex business system, where the program may reside in application 204 (FIG. 2).

The following provides a brief description of these software components. A more detailed description of these software components is provided below in conjunction with FIGS. 4-7, where their functionalities are specifically discussed in connection with the method of correlating business events in a complex business system.

Referring again to FIG. 3, in conjunction with FIG. 1, the software components include a monitoring engine 301 configured to monitor the incoming event streams (stream of data concerning an event) to "nodes," which refers to systems or processes involved the complex business system 100 as discussed further below. Furthermore, monitoring engine 301 is connected to correlation engine 302 which is configured to correlate instances of event streams using metadata associated with the interconnection between the nodes involving the event streams as discussed further below in connection with FIGS. 4-7. Metadata, as used herein, refers to the data regarding the transport type of these links. Metadata may also be referred to herein as the "link metrics." In one embodiment, monitoring engine 301 provides such link metrics to correlation engine 302.

As stated above, a more detailed description of the functionality of these software components is provided below in connection with FIGS. 4-7.

FIG. 4 is a flowchart of a method 400 for correlating business events in a complex business system 100 in accordance with an embodiment of the present invention.

Referring to FIG. 4, in conjunction with FIGS. 1-3, in step 401, monitoring engine 301 generates a flow diagram to correlate multiple events from separate processes as illustrated in FIG. 5. FIG. 5 illustrates a flow diagram 500 generated by monitoring engine 301 that includes a representation of complex business system 100 in the form of nodes 501A-501C (identified as "Node A," "Node B," and "Node C," respectively in FIG. 5) that are interconnected via "links" 502A-502B, respectively. Nodes 501A-501C may collectively or individually be referred to as nodes 501 or node 501, respectively. Links 502A-502B may collectively or individually be referred to as links 502 or link 502, respectively. Nodes 501 refer to the systems or processes (e.g., online purchase, inventory system) that are involved in the complex business system 100. In one embodiment, each node 501 represents a process involved in a business activity or transaction. Links 502 refer to the transport connections between nodes 501, such as for example, HyperText Transport Protocol (HTTP), File Transfer Protocol (FTP), messaging middleware, etc.

Referring to FIG. 4, in conjunction with FIGS. 1-5, in step 402, monitoring engine 301 monitors the event streams generated from nodes 501. An event stream refers to a stream of data concerning an event that occurred in the business transaction.

In step 403, monitoring engine 301 identifies an instance of an event stream (e.g., data concerning an online purchase) from a node 501 (e.g., node 501A) that is to be connected to an instance of an event stream (e.g., data concerning inventory) from a neighboring node 501 (e.g., node 501B). Such an instance is identified when a node 501 transports the transaction across link 502 (referred to herein as "exercising link" or "utilizing link") as discussed further below in connection with FIGS. 6-7.

In step 404, monitoring engine 301 obtains the metadata (data regarding the transport type of link 502) contained within the event stream associated with the connection (e.g., link 502A) that was used to transport the transaction between the nodes 501 (e.g., node 501A and neighboring node 501B).

In step 405, correlation engine 302 correlates the instances of the event streams (e.g., data concerning an online purchase, data concerning inventory) generated from nodes 501 (e.g., nodes 501A, 501B) using the obtained metadata.

In step 406, correlation engine 302 assigns each instance of the event streams with an identification (referred to herein as the "visibility identification"). A more detailed description of the visibility identification is provided below in connection with FIGS. 6-7. In this manner, business events are correlated without the requirement of users providing a common key or a set of keys as well as without the requirement of monitoring each user of the system throughout the entire transaction.

In some implementations, method 400 may include other and/or additional steps that, for clarity, are not depicted. Further, in some implementations, method 400 may be executed in a different order presented and that the order presented in the discussion of FIG. 4 is illustrative. Additionally, in some implementations, certain steps in method 400 may be executed in a substantially simultaneous manner or may be omitted.

A discussion of correlating the instances of the event streams (e.g., data concerning an online purchase, data concerning inventory) arriving at nodes 501 (e.g., nodes 501A, 501B of FIG. 5) using the obtained metadata and assigning a visibility identification to each instance is provided below in connection with FIG. 6. FIG. 6 is a diagram illustrating examples of the possible interactions between nodes 501 (FIG. 5) involving the event streams of nodes 501 in accordance with an embodiment of the present invention. Referring to FIG. 6, in conjunction with FIGS. 3 and 5, FIG. 6 illustrates the event streams and the interactions of these event streams by nodes 501, such as nodes 501A, 501B and 501C as illustrated in FIG. 5. The column labeled "Node A Monitoring Context" 601A refers to the interactions concerning event streams for Node A 501A. The column labeled "Node B Monitoring Context" 601B refers to the interactions concerning event streams for Node B 501B. Further, the column labeled "Node C Monitoring Context" 601C refers to the interactions concerning event streams for Node C 501C. Additionally, the diagram of FIG. 6 illustrates a column labeled "correlation service" 602, which refers to the actions being performed by correlation engine 302. A more detailed description of these actions is discussed further below in connection with the discussion of FIG. 7.

Furthermore, FIG. 6 illustrates entries in a table 603, referred to herein as the "link table," which is used by correlation engine 302, to determine if there is a match with the link metrics associated with link 502 that was used to transport the transaction to node 501. In one embodiment, link table 603 may be stored in disk unit 208 or in a memory, such as memory 205. In one embodiment, each entry of link table 603 includes a field 604 for indicating whether a visibility identification (identified as "Visibility ID" in FIG. 6) has been assigned in association with the transfer of the transaction over link 502, where a "1" in field 604 indicates that such a visibility identification has been assigned in connection with the transfer of the transaction over link 502 for that entry of link table 603. Furthermore, each entry of link table 603 includes a field 605 for storing the process identification for the "out system" node 501 (identified as "Out System Instance ID" in FIG. 6). An "out system" node 501 refers to node 501 (e.g., node 501A) that utilizes link 502 (e.g., link 502A) to transport the transaction to a neighboring node 501 (e.g., node 501B). An "in system" node 501 refers to node 501 (e.g., node 501B) that receives an incoming event stream over a link 502 (e.g., link 502) that was utilized by a preceding node 501 (e.g., node 501A). A node's process identification refers to an identification used internally by that particular node 501 to connect events according to the particular scheme implemented by that particular node 501. An out system node's 501 process identification is stored in field 605; whereas, an in system node's 501 process identification is stored in field 607 (referred to as "In System Instance ID" in FIG. 6). Additionally, each entry in link table 603 contains a field 606 storing the link metrics. As discussed above, link metrics (also referred to as "metadata") refers to the data regarding the transport type of these links. A more detail description of the use of link table 603 by correlation engine 302 is provided below in conjunction with FIG. 7.

The diagram of FIG. 6 will now be discussed in conjunction with FIG. 7, which is a flowchart of a method for correlating business events in a complex business system based on the diagram of FIG. 6 in accordance with an embodiment of the present invention.

Referring to FIG. 7, in conjunction with FIGS. 1-6, in step 701, monitoring engine 301 obtains the link metrics for a link 502 (e.g., link 502A) between a node 501 (e.g., node 501A) and a neighboring node 501 (e.g., node 501B) (may also be a preceding node) which are provided to correlation engine 302. In one embodiment, monitoring engine 301 obtains the link metrics for each link 502 provided in flow diagram 500 (FIG. 5).

In step 702, monitoring engine 301 monitors the event streams generated from nodes 501. For example, referring to FIG. 6, monitoring engine 301 monitors event streams identified by "1, 2 and 3" arriving at node 501A. Additionally, monitoring engine 301 monitors event streams identified by "5*a*, 5*b*, 7 and 8" arriving at node 501B. Furthermore, monitoring engine 301 monitors event streams identified by "10*a* and 10*b*" arriving at node 501C. It is noted for clarity that the event streams of FIG. 6 are not shown in chronological order and that the various actions performed by correlation engine 302 as identified under correlation service 602 may not be dependent upon the prior action performed by correlation engine 302 except as noted herein. FIG. 6 is used to illustrate various cases that may occur, where such cases are independent from each other.

Returning to FIG. 7, in conjunction with FIGS. 1-6, in step 703, a determination is made by correlation engine 302 as to whether a link 502 to a neighboring node 501 (e.g., node 501B) is utilized by node 501 (e.g., node 501A). That is, a determination is made by correlation engine 302 as to whether node 501 (e.g., node 501A) utilized link 502 (e.g., link 502A) to transport a transaction to a neighboring node 501 (e.g., node 501B). For example, node 501A utilized link 502A to transport the transaction involving event stream 3 to node 501B, where correlation engine 302 is informed of the utilization of link 502A by node 501A to transport the transaction as indicated by line 4*a*. In another example, node 501B utilized link 502A in receiving event streams 5*a*, 5*b*, where correlation engine 302 is informed of the utilization of link 502A in receiving event streams 5*a*, 5*b* as indicated by lines 6*a*, 6*b*, respectively. In a further example, node 501B utilized link 502B to transport the transaction involving event stream 8 to node 501C, where correlation engine 302 is informed of the utilization of link 502B by node 501B to transport the transaction as indicated by line 9*a*. In an additional example, node 501C utilized link 502B in receiving event streams 10*a*, 10*b*, where correlation engine 302 is informed of the utilization of link 502B in receiving event streams 10*a*, 10*b* as indicated by lines 11*a*, 11*b*, respectively.

If link 502 has not been utilized by node 501 to transport the transaction to a neighboring node 501, then, monitoring engine 301 continues to monitor the event streams generated from nodes 501 in step 702.

If, however, node 501 has utilized link 502 to transport the transaction to a neighboring node 501, then, in step 704, correlation engine 302 examines link table 603 to determine if there is an existing match between the link metrics of link 502 utilized to transport the transaction and the link metrics of a neighboring node 501 stored in link table 603.

In step 705, a determination is made by correlation engine 302 as to whether there is a match between the link metrics associated with link 502 utilized by node 501 and the link metrics for a link 502 connected to a neighboring node 501 stored in link table 603 (i.e., the link metrics stored in field 606).

If there is not a match, then a determination is made by correlation engine 302 in step 706 as to whether node 501 that utilized link 502 was an out system node.

If an out system node utilized link 502, then, in step 707, a determination is made by correlation engine 302 as to whether node 501 is an "initiating node," where an initiating node refers to a node at the start of flow diagram 500 (e.g., node 501A) with no input link.

If node 501 is not an initiating node, then, in step 708, correlation engine 302 updates an entry of link table 603 by adding the node's 501 process identification, the link metrics associated with the utilized link 502 as well as an indication that the visibility identification has been created to link table 603. In one embodiment, since node 501 is an out system node, there is an implication that there was a visibility identification provided to this node 501 (e.g., node 501B) when it acted as an in system node and received the visibility identification from the preceding neighboring node 501 (e.g., node 501A).

For example, referring to FIG. 6, node 501B utilized link 502B to transport the transaction involving event stream 8 to node 501C, where the indication of transporting the transaction is provided to correlation engine 302 as indicated by line 9*a*. In the scenario in which there were no matching link metrics associated with the neighboring node(s) 501, correlation engine 302 adds in entry 612 of link table 603 node's 501B process identification (identified as "B:1111" in field 605) and the link metrics associated with the utilized link 502B (e.g., identified as "abc.zip" in field 606) as well as includes an identification of "1" in field 604 to signify that a visibility identification has been created in connection with the event stream that utilized this particular link 502.

Returning to step 707 of FIG. 7, in conjunction with FIGS. 1-6, if, however, node 501 is an initiating node, then, in step 709, correlation engine 302 creates a visibility identification (internal global or common key) to be associated with the event stream that utilized link 502. In one embodiment, the visibility identification is only created when the out of system node 501 is an initiating node and notifies correlation engine 302 of utilizing link 502. In one embodiment, the visibility identification is not created when the in system node 501 notifies correlation engine 302 of when link 502 is utilized.

In step 710, correlation engine 302 updates link table 603 by adding node's 501 process identification, the link metrics associated with the utilized link 502 as well as an indication of creating the visibility identification to an entry in link table 603. For example, referring to FIG. 6, node 501A utilized link 502A to transport the transaction involving event stream 3, where the indication of transporting the transaction was provided to correlation engine 302 as indicated by line 4a. In the scenario in which there were no matching link metrics associated with the neighboring node(s) 501, correlation engine 302 adds in entry 608 of link table 603 node's 501A process identification (identified as "A:1111" in field 605) and the link metrics associated with the utilized link 502 (e.g., identified as "xyz.xml" in field 606) as well as includes an identification of "1" in field 604 to signify that a visibility identification has been created in connection with the event stream that utilized this particular link 502.

In step 711, correlation engine 302 notifies node 501 (e.g., out system node) that a visibility identification has been created in connection with the transported transaction.

Returning to step 706, if the in system node 501 utilized link 502, then, in step 712, correlation engine 302 updates link table 603 by adding the node's 501 process identification and the link metrics associated with the utilized link 502 to an entry in link table 603. For example, referring to FIG. 6, node 501B received event stream 5a from node 501A which utilized link 502A to transport the transaction involving event stream 5a to node 501B. The indication of transporting the transaction to node 501B was provided to correlation engine 302 as indicated by line 6a. In the scenario in which there were no matching link metrics associated with the neighboring node(s) 501, correlation engine 302 adds in entry 609 of link table 603 node's 501B process identification (identified as "B:1111" in field 607) and the link metrics associated with the utilized link 502A (e.g., identified as "xyz.xml" in field 606).

In another example, node 501C received event stream 10a from node 501B which utilized link 502B to transport the transaction involving event stream 10a to node 501C. The indication of receiving event stream 10a by node 501C was provided to correlation engine 302 as indicated by line 11a. In the scenario in which there were no matching link metrics associated with the neighboring node(s) 501, correlation engine 302 adds in entry 613 of link table 603 node's 501C process identification (identified as "C:1111" in field 607) and the link metrics associated with the utilized link 502B (e.g., identified as "abc.zip" in field 606).

Returning to step 705 of FIG. 7, in conjunction with FIGS. 1-6, if there is a match between the link metrics associated with link 502 utilized by node 501 and the link metrics for link 502 connected to a neighboring node 501 stored in an entry in link table 603, then, in step 713, a determination is made by correlation engine 302 as to whether node 501 that utilized link 502 was an out system node.

If an out system node utilized link 502, then, in step 714, a determination is made by correlation engine 302 as to whether node 501 is an "initiating node," where an initiating node refers to a node at the start of flow diagram 500 with no input link.

If node 501 is not an initiating node, then, in step 715, correlation engine 302 updates link table 603 by adding the node's 501 process identification as well as an indication that the visibility identification has been created to the matching entry in link table 603. In one embodiment, since node 501 is an out system node, there is an implication that there was a visibility identification provided to this node 501 when it acted as an in system node and received the visibility identification from the preceding neighboring node 501.

For example, referring to FIG. 6, node 501B utilized link 502B to transport the transaction involving event stream 8 to node 501C, where correlation engine 302 is informed of the utilization of link 502B by node 501B to transport the transaction as indicated by line 9a. In the scenario in which there were matching link metrics associated with the neighboring node(s) 501 (e.g., node 501C), where information pertaining to the link metrics and the in system instance identification were already stored in link table 603 as shown in entry 613, correlation engine 302 adds in entry 614 of link table 603 node's 501B process identification (identified as "B:1111" in field 605) as well as includes an identification of "1" in field 604 to signify that a visibility identification has been created in connection with the event stream that utilized this particular link 502.

Returning to FIG. 7, in conjunction with FIGS. 1-6, in step 716, correlation engine 302 notifies nodes 501 (e.g., in system node and out system node) identified in the link table entry that a visibility identification has been created in connection with the transported transaction.

Referring to step 714, if, however, node 501 is an initiating node, then, in step 717, correlation engine 302 creates a visibility identification (internal global or common key) to be associated with the event stream that utilized link 502.

In step 718, correlation engine 302 updates link table 603 by adding node's 501 process identification as well as the created visibility identification to the matching entry in link table 603. For example, referring to FIG. 6, node 501A utilized link 502A to transport the transaction involving event stream 3, where correlation engine 302 is informed of such utilization as indicated by line 4a. In the scenario in which there were matching link metrics associated with the neighboring node(s) 501 (e.g., node 501B), where information pertaining to the link metrics and the in system instance identification were already stored in link table 603 as shown in entry 609, correlation engine 302 adds in entry 610 of link table 603 node's 501A process identification (identified as "A:1111" in field 605) as well as includes an identification of "1" in field 604 to signify that a visibility identification has been created in connection with the event stream that utilized this particular link 502.

In step 719, correlation engine 302 notifies nodes 501 (e.g., out system node, in system node) identified in the link table entry that a visibility identification has been created in connection with the transported transaction. In the example discussed above pertaining to node 501A utilizing link 502A to transport the transaction involving event stream 3, the visibility identification is published to nodes 501A, 501B as shown by line 4c of FIG. 6 since there is a completed link as shown in entry 610. A "completed link," as referred to herein, refers to the entry of link table 603 containing all the required information so that instances of event streams can be correlated.

Referring to step 713, if the in system node utilized link 502, then, in step 720, correlation engine 302 updates link table 603 by adding the in system node's 501 process identification to the matching entry in link table 603. For example, referring to FIG. 6, node 501B received event stream 5b from node 501A which utilized link 502A to transport the transaction involving event stream 5b to node 501B. Node 501B informs correlation engine 302 of receiving event stream 5b over link 502A as indicated by line 6b. In the scenario in which there was a matching entry in link table 603 (link metrics for link 502A was stored in field 606, node's 501A process identification was stored in field 605 and there was an indication of a previously created visibility identification in field 604), correlation engine 302 adds in entry 611 of link table 603 node's 501B process identification (identified as "B:1111" in field 605).

In another example, referring to FIG. 6, node 501C received event stream 10b from node 501B which utilized link 502B to transport the transaction involving event stream 10b to node 501C. Node 501C informs correlation engine 302 of receiving event stream 10b over link 502B as indicated by line 11b. In the scenario in which there was a matching entry in link table 603 (link metrics for link 502B was stored in field 606, node's 501B process identification was stored in field 605 and there was an indication of a previously created visibility identification in field 604), correlation engine 302 adds in entry 615 of link table 603 node's 501C process identification (identified as "C:1111" in field 605).

Returning to FIG. 7, in conjunction with FIGS. 1-6, in step 721, correlation engine 302 notifies nodes 501 (e.g., in system node and out system node) identified in the link table entry that a visibility identification has been created in connection with the transported transaction.

In some implementations, method 700 may include other and/or additional steps that, for clarity, are not depicted. Further, in some implementations, method 700 may be executed in a different order presented and that the order presented in the discussion of FIG. 7 is illustrative. Additionally, in some implementations, certain steps in method 700 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for correlating business events in a business system, the method comprising:
    generating a flow diagram comprising a plurality of nodes and links interconnected between said plurality of nodes, wherein each of said plurality of nodes represents a process involved in a coordinated transaction;
    monitoring event streams generated from said plurality of nodes;
    identifying an instance of a first event stream from a first node that is to be connected to an instance of a second event stream from a second node, wherein said second node is a neighboring node of said first node;
    obtaining metadata contained within one of said first event stream and said second event stream associated with a link utilized to transport said coordinated transaction between said first node and said second node; and
    correlating said instances of said first and said second event streams with said obtained metadata; and
    assigning, by a processor, each instance of said first and said second event streams with an identification.

2. The method as recited in claim 1 further comprising:
    obtaining link metrics associated with said links interconnected between said plurality of nodes.

3. The method as recited in claim 2 further comprising:
    examining a table to determine if there exists a match between a link metric stored in an entry of said table and a link metric associated with a link being utilized by a process of a node in response to said link being utilized by said process of said node.

4. The method as recited in claim 3 further comprising:
    updating said table by adding an identification of one of said process of said node and a process of a neighboring node in said entry of said table in response to said match existing.

5. The method as recited in claim 3 further comprising:
    creating an identification to be assigned to both an instance of an event stream from said node and to an instance of an event stream from a neighboring node in response to said match existing; and
    updating said table by adding an identification of said process of said node and an indication of creating said identification in said entry of said table in response to said match existing.

6. The method as recited in claim 3 further comprising:
    updating said table by adding an identification of one of said process of said node and a process of a neighboring node and said link metric associated with said utilized link to an entry of said table in response to said match not existing.

7. The method as recited in claim 3 further comprising:
    creating an identification to be assigned to both an instance of an event stream from said node and to an instance of an event stream from a neighboring node in response to said match not existing; and
    updating said table by adding an identification of said process of said node, said link metric associated with said utilized link and an indication of creating said identification to an entry of said table in response to said match not existing.

* * * * *